(12) United States Patent
Verma et al.

(10) Patent No.: US 11,478,701 B1
(45) Date of Patent: Oct. 25, 2022

(54) QUASI CLOUD RENDERING TECHNIQUE FOR LEGACY DATABASES USING GAME ENGINES

(71) Applicant: Rockwell Collins, Inc., Cedar Rapids, IA (US)

(72) Inventors: Abhishek Verma, Addison, TX (US); Jeanette M. Ling, Park City, UT (US); Rishabh Kaushik, North Salt Lake, UT (US); Danilo P Groppa, Pasadena, CA (US); Triston Thorpe, Midvale, UT (US)

(73) Assignee: Rockwell Collins, Inc., Cedar Rapids, IA (US)

(*) Notice: Subject to any disclaimer, the term of this patent is extended or adjusted under 35 U.S.C. 154(b) by 168 days.

(21) Appl. No.: 17/091,705

(22) Filed: Nov. 6, 2020

(51) Int. Cl.
*A63F 13/355* (2014.01)
*G06T 1/20* (2006.01)
*A63F 13/577* (2014.01)

(52) U.S. Cl.
CPC .......... *A63F 13/355* (2014.09); *A63F 13/577* (2014.09); *G06T 1/20* (2013.01); *A63F 2300/538* (2013.01)

(58) Field of Classification Search
CPC .... A63F 13/355; A63F 13/577; A63F 13/352; A63F 2300/53; A63F 2300/531; A63F 2300/538; G06T 1/20
USPC .......................................................... 463/31
See application file for complete search history.

(56) References Cited

U.S. PATENT DOCUMENTS

| | | | |
|---|---|---|---|
| 9,358,460 B2* | 6/2016 | Ahiska | A63F 13/60 |
| 9,993,729 B2* | 6/2018 | Perry | A63F 13/352 |
| 10,252,171 B2* | 4/2019 | Huang | A63F 13/355 |
| 10,594,901 B2* | 3/2020 | Sines | H04N 19/42 |
| 10,735,778 B2 | 8/2020 | Han et al. | |
| 2015/0126282 A1* | 5/2015 | Hitomi | A63F 13/355 463/42 |
| 2018/0167449 A1 | 6/2018 | Zhu et al. | |
| 2019/0122121 A1* | 4/2019 | Yu | A61K 47/545 |
| 2019/0227843 A1 | 7/2019 | Custodio et al. | |
| 2020/0026575 A1 | 1/2020 | Guim Bernat et al. | |

FOREIGN PATENT DOCUMENTS

CN 110018834 A 7/2019

OTHER PUBLICATIONS

Nardelli, M. et al., "Osmotic Flow: Osmotic Computing+IoT Workflow,", IEEE Cloud Computing, vol. 4, No. 2, pp. 68-75, Mar.-Apr. 2017.
Dzulko, Mark, "Bohemia Interactive Simulations Uses Epic Games Megagrant to Extend VBS World Server Capabilities to Unreal", VBS®4, Press Release, Nov. 3, 2020, 12 pages.

* cited by examiner

*Primary Examiner* — Allen Chan
(74) *Attorney, Agent, or Firm* — Suiter Swantz pc llo

(57) ABSTRACT

A rendering system includes a cloud component and a local edge component. The cloud component receives or retrieves legacy data from various sources and preprocesses the data into a format. The local edge component receives the preprocessed data from the cloud component and performs local rendering steps necessary to place the preprocessed data into a form suitable for a game engine. The game engine utilizes the preprocessed data to render an image stream. The system is embodied in a flight simulator.

15 Claims, 5 Drawing Sheets

US 11,478,701 B1

QUASI CLOUD RENDERING TECHNIQUE FOR LEGACY DATABASES USING GAME ENGINES

BACKGROUND

Improvements in graphics processing units (GPUs) and underlying application programming interfaces enable game-quality graphics at low latency. There is a need for rendering with modern graphics capabilities while fulfilling legacy requirements such as low latency, frame determinism, sensor channels, large traversable areas, non-distracting levels of detail (LODs), and multi-channel synchronization. Even though the game engines and the modern GPU constructs can produce modern graphics at low latencies, these requirements are not yet being served. Additionally, with the availability of cloud services, the hardware cost required to run image generating software may be reduced marginally while allowing unlimited multi-user environments. Game engines provide an effective platform to build a rendering software application using modern graphics application programming interfaces.

SUMMARY

In one aspect, embodiments of the inventive concepts disclosed herein are directed to a rendering system having a cloud component and a local edge component. The cloud component receives or retrieves legacy data from various sources and preprocesses the data into a format useable by a local edge component, and potentially some data into a game format. The local edge component receives the preprocessed data from the cloud component and performs local rendering steps necessary to place the preprocessed data into a form suitable for a game engine. The game engine utilizes the preprocessed data to render an image stream. In a further aspect, the system is embodied in a flight simulator.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
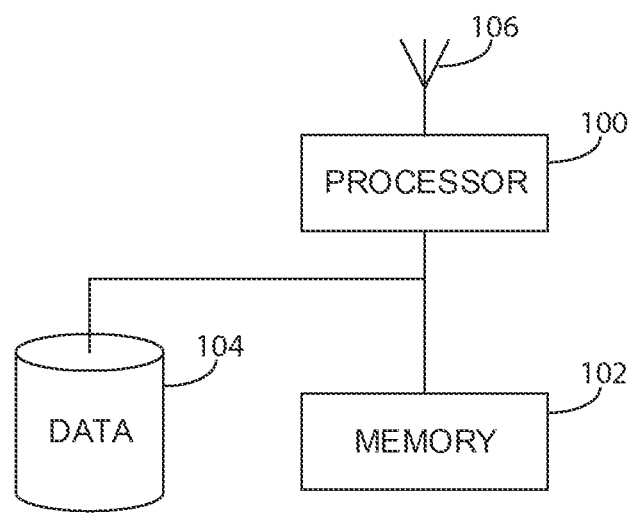
FIG. 1 shows a block diagram of a computer system useful for implementing embodiments of a rendering system.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a rendering system having a cloud component and a local edge component. The cloud component receives or retrieves legacy data from various sources and preprocesses the data into a format useable by a local edge component, and potentially some data into a game format. The local edge component receives the preprocessed data from the cloud component and performs local rendering steps necessary to place the preprocessed data into a form suitable for a game engine. The game engine utilizes the preprocessed data to render an image stream.

Referring to FIG. 1, a block diagram of a computer system useful for implementing embodiments of a rendering system is shown. Both a cloud component and an edge component may include a processor 100, memory 102 connected to the processor 100 for storing processor executable code, one or more data storage elements 104, and one or more data communication elements 106, including wireless communication elements.

In a cloud component, the processor 100 receives instructions to retrieve data from the one or more data storage elements 104 to preprocess the data into a format suitable for an edge component executing one or more game engine components. Such data may generally correspond to legacy data elements including height maps, textures, etc. In at least one embodiment, preprocessing involves converting the height maps, textures, etc. into a standardized game engine compatible format.

In an edge component, the processor 100 receives preprocessed data from a corresponding cloud component and prepares the preprocessed data for rendering by a game engine element. In at least one embodiment, the processor 100 may convert preprocessed data from a spherical coordinate system to a Cartesian coordinate system, and optionally, in at least one embodiment, tessellated as necessary. Data may be converted from double precision to single precision centered on a user's eyepoint, and optionally, in at least one embodiment, upconverted to a higher resolution. Legacy action commands may be converted to corresponding game engine commands. In at least one embodiment, preprocessed data may be encrypted; in that case, the processor 100 may decrypt the preprocessed data. Furthermore, the processor 100 clock may be used to establish a deterministic frame rate in a rendered image stream. In at least one embodiment, the edge component uses an external synchronization source or vsync from a graphics processing unit to control functions that drive the time-critical operations of the system to ensure a deterministic frame rate (60 Hz, 90 Hz, 120 Hz, etc.)

The edge component processor 100 establishes or instantiates a game engine with various components specifically adapted for the edge component. In at least one embodiment, the game engine interprets legacy commands that may have been previously converted by other components in the edge processor 100. In at least one embodiment, the game engine may invoke various shaders to render post processed effects, atmospheric effects, lighting, and sensor effects. The game engine triggers these shaders based on the inputs received from the cloud renderer. The cloud renderer makes those decisions based on the eyepoint relayed by the edge component.

Figure 2:
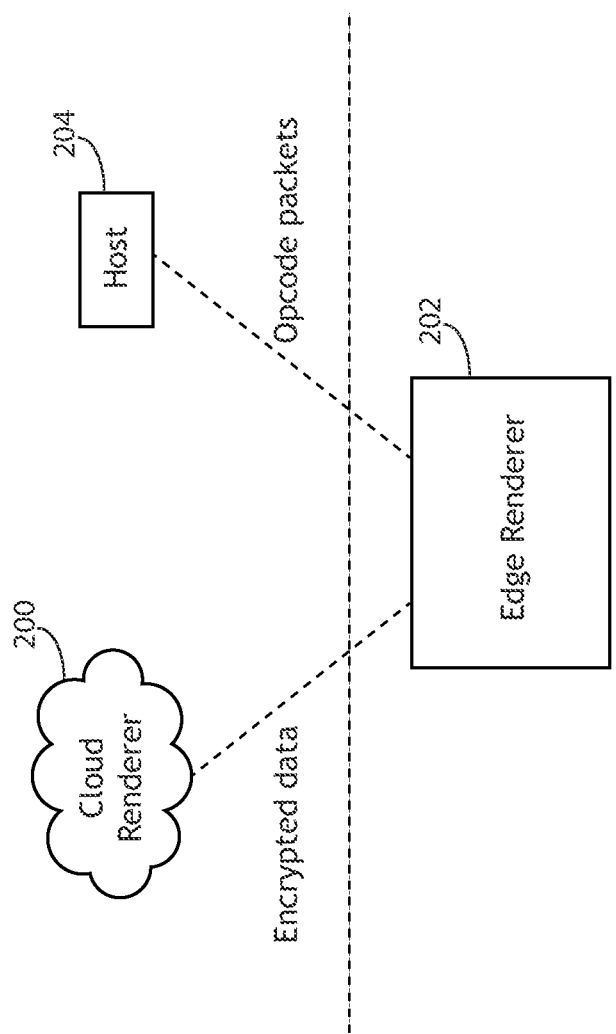
FIG. 2 shows a block diagram of a system according to an exemplary embodiment.

Referring to FIG. 2, a block diagram of a system according to an exemplary embodiment is shown. The system includes a cloud renderer 200 to preprocess certain legacy data elements for interpretation by a game engine instantiated in an edge renderer 202. In at least one embodiment, a host 204 in data communication with the edge renderer 202 supplies opcode data packets to control the edge renderer 202.

Legacy data on the cloud renderer 200 may comprise data storage elements not locally available to the edge renderer 202, and not publicly available (for example, military data sources). In at least one embodiment, a datalink connection between the cloud renderer 200 and edge renderer 202 may be encrypted such that legacy data is maintained in a cloud storage while localized, game engine compatible versions of the data are available to the edge renderer in an encrypted form.

In at least one embodiment, a single cloud renderer 200 may produce preprocessed legacy data servicing a plurality of edge renderers 202 that each are configured to operate in a same or similar area of interest.

Figure 3:
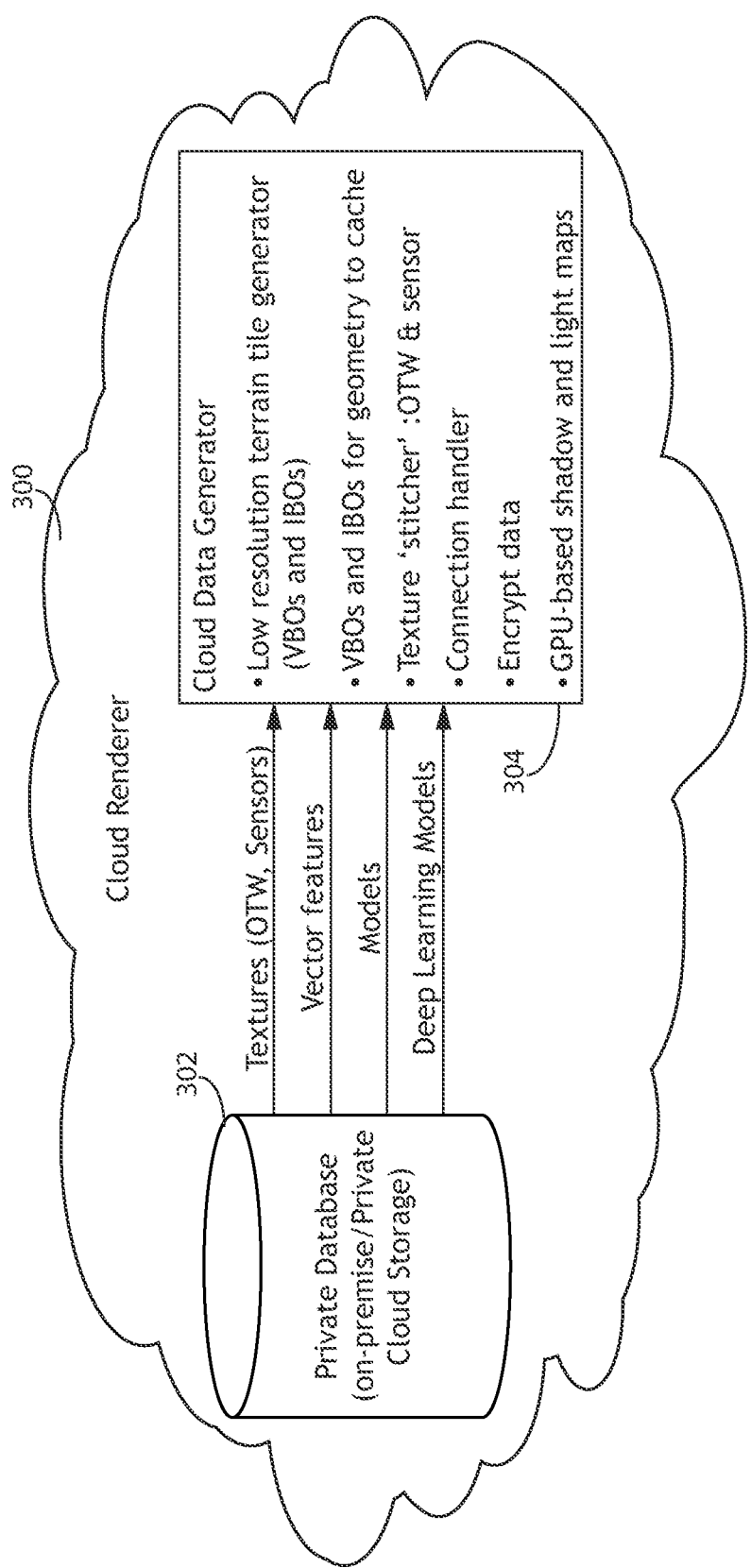
FIG. 3 shows a block diagram of a cloud component of a system according to an exemplary embodiment.

Referring to FIG. 3, a block diagram of a cloud component 300 of a system according to an exemplary embodiment is shown. A cloud renderer 300 comprises one or more data storage elements 302. The data storage elements 302 may be private on-premises or cloud storage not otherwise publicly available. Likewise, the cloud component 300 may be hosted either on a cloud service or an on-premise server. The cloud component 300 may stream data to any edge component including a personal computer (PC), Mac, Android Tablets, internet of things (IoTs), iPads, etc., and may service more than one edge component at a time.

The data storage elements 302 may include legacy data sources storing textures derived from sensors or out-the-window (OTW) sources, vectors, object models, learning models, etc. When preparing legacy data for rendering by a game engine, a cloud data generator 304 (embodied in a computer processor) retrieves data from the data storage elements 302 and preprocess the data into a format suitable for an edge component executing one or more game engine components. The data storage elements 302 may contain raw information that can be used by image generation software to represent the whole earth. The data may be expressed using a spherical coordinate system and may require double precision to store. Such information includes models (OpenFlight files), vector features, textures, deep learning models, and shadow and light maps.

The cloud data generator 304 produces intermediate data based on the raw information from the data storage elements 302. The cloud data generator 304 may execute components or processes to generate low resolution terrain tiles in OpenGL formats such as vertex buffer objects (VBO) and index buffer objects (IBO) that may be cached on the graphics processing unit of an edge component; tiles may be generated using a position or eyepoint received from an edge component. Likewise, the cloud data generator 304 may execute components or processes to stitch together textures and/or images from one or more sources based on an identified local area of interest and/or deep learning models to synthesize textures and terrain models around the eyepoint. The cloud data generator 304 may execute components or processes to perform other legacy data processing functions, including data encryption, and communication with one or more corresponding edge rendering components. In at least one embodiment, the cloud data generator 304 may receive format or resolution parameters from a game engine executing on an edge component based on user inputs.

Figure 4:
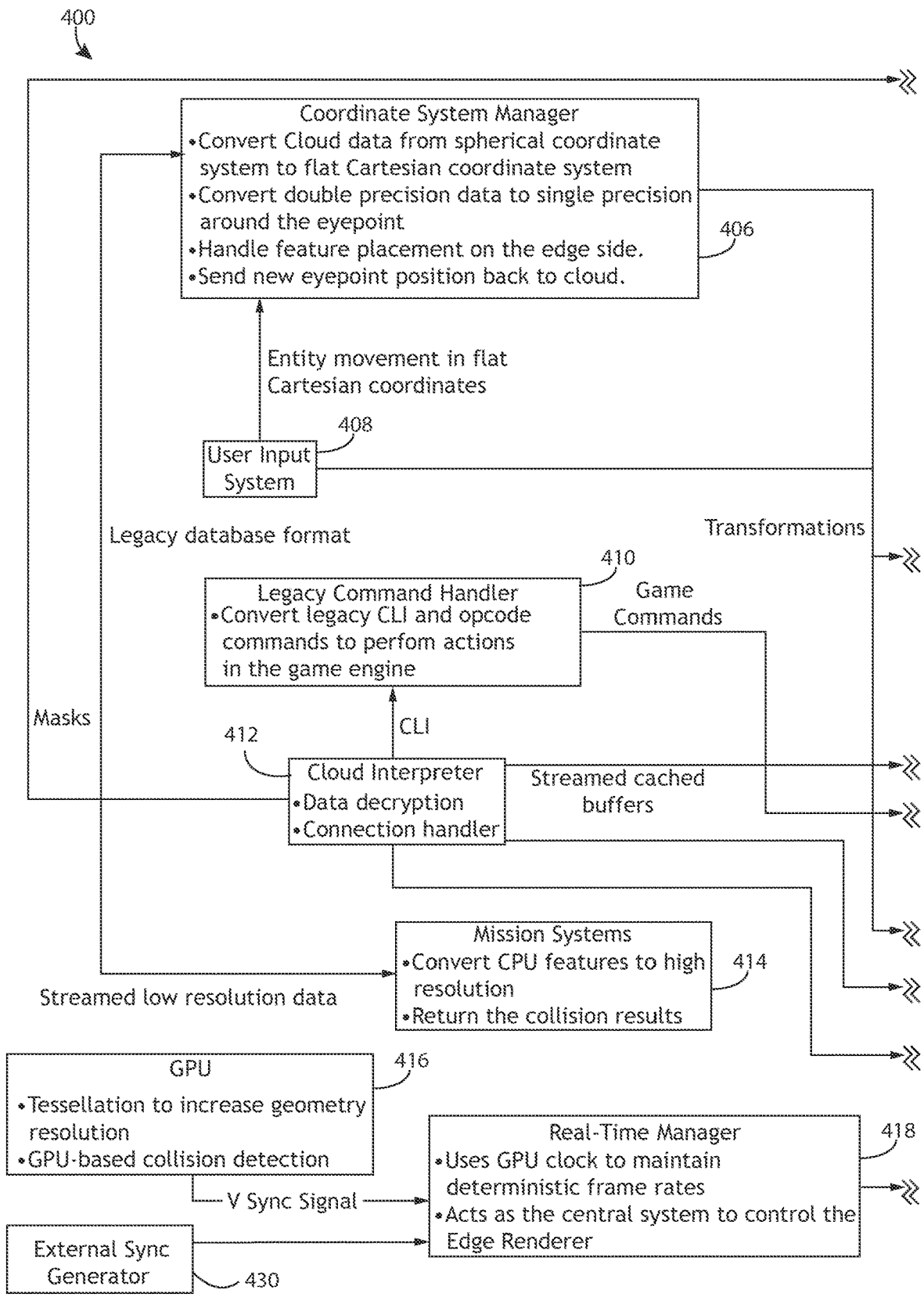
FIG. 4 shows a block diagram of an edge component of a system according to an exemplary embodiment.
Figure 4:
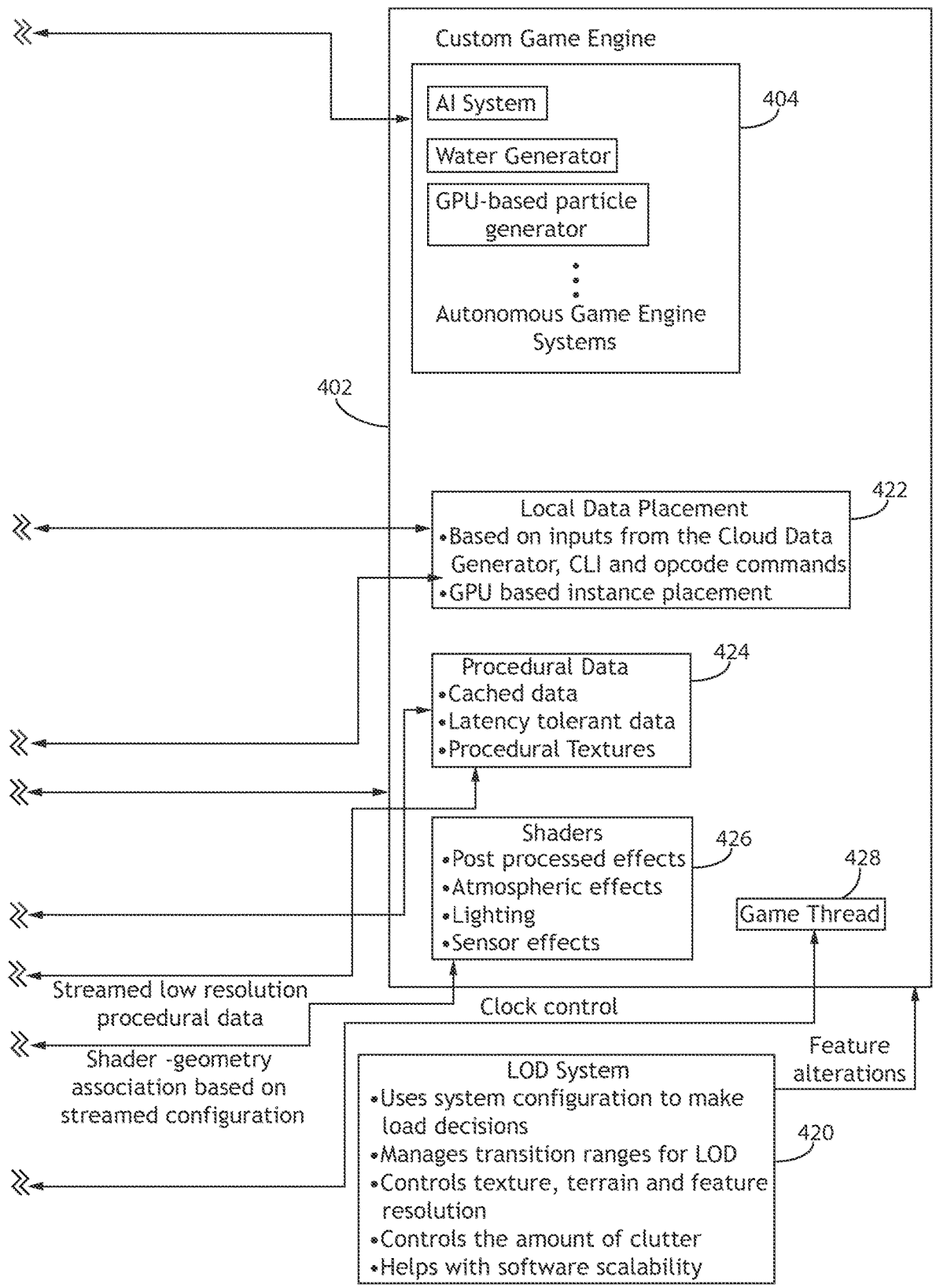

Referring to FIG. 4, a block diagram of an edge component 400 of a system according to an exemplary embodiment is shown. The edge component 400 instantiates a game engine 402 include an autonomous game engine system 404 including a plurality of standardized game engine components such as an artificial intelligence (AI) system, water generator, particle generator, etc. In at least one embodiment, the game engine 402 also includes customized processing modules 422, 424, 426, 428. The customized processing modules 422, 424, 426, 428 may be configured to communicate with non-game engine modules 406, 408, 410, 412, 414, 416, 418, 420 of the edge component 400.

In at least one embodiment, the non-game engine modules 406, 408, 410, 412, 414, 416, 418, 420 may comprise a cloud interpreter module 412 that may perform initial decryption and connection handling to a cloud component. A coordinate system manager module 406 configured to receive inputs from a cloud interpreter module 412 and a user input system module 408 to convert cloud data from a spherical coordinate system to a flat Cartesian coordinate system, and to an eyepoint origin; perform feature placement within the edge component domain; communicate an eyepoint position to a cloud component; etc. The user input system module 408 may receive user inputs, communicate new parameters to the coordinate system manager module 406, and provide entity transformation (such as eyepoint) in a flat, Cartesian coordinate system. The cloud interpreter module 412 provides legacy database format transformation data received from a cloud component. The game engine 402 may require data to be rendered using a single precision Cartesian coordinate system. The coordinate system manager module 406 may also compute transformations to place features in the game engine 402 and send eyepoint information back to a cloud component in a spherical coordinate system.

A legacy command handler module 410 receives opcode commands and command line interface (CLI) commands in a legacy format, either from a host connected to the edge component 400 or a cloud component, and converts those commands into an equivalent that is interpretable by the game engine 402 by calling appropriate functions in the game engine 402 to produce the necessary visual changes. The legacy command handler module 410 may also handle opcodes, such as Common Image Generator Interface opcodes, received from a typical flight simulation host. Certain applications may have specialized inputs corresponding to specialized avionics mission systems; therefore, a mission system module 414 converts central processing unit (CPU) features to a desired resolution and performs certain collision calculations. The mission system module 414 may receive low resolution collision and geometry information from the cloud component and upscale that data to match upscaling by a graphics processing unit. In at least one embodiment, the mission system module 414 sends upscaled collision results back to the cloud component and/or a host.

A graphics processing unit module 416 increases geometry resolution via tessellation, and may perform collision detection. In at least one embodiment, the graphics processing unit module 416 uses GPU accelerated collision detection algorithms to handle basic interactions between different features, allowing a reduction in the data that needs to be transferred from the cloud component. In at least one embodiment, a real-time manager module 418 uses a graphics processing unit clock from the graphics processing unit module 416 to establish a deterministic frame rate and generally control the frequency to update frames of the edge component 400. In at least one embodiment, a level-of-detail module 420 may utilize system configuration data to make load decisions; manage transition ranges; adjust texture, terrain, and feature resolution; control scalability; etc.

In at least one embodiment, the customized processing modules 422, 424, 426, 428 may include a local data placement module 422 that interprets opcode commands and preprocessed legacy data for routing to the appropriate autonomous game engine system modules. The local data placement module 422 handles spawning and placement of models and textures that are present locally in the game engine environment.

A procedural data module 424 receives cached data, latency tolerant data, and procedural textures for use by the autonomous game engine system modules. The procedural data module 424 creates procedural meshes and textures from the received data which may be cached or procedurally-generated. Cached data may be persistently cached in a GPU memory to optimize bus transfers between the CPU and the GPU; procedurally-generated data includes features such as terrain-skin that may change frequently. In at least one embodiment, the cloud interpreter module 412 relays format transformation data to the procedural data module 424 which then determines what portion of the data to cache. Cached cloud component information may control rendering on the edge component 400.

A shader module 426 may direct the application of various shaders such as lighting effects, atmospheric effects, sensor effects as defined by one or more avionics systems, etc. based on information received from cloud component such as geometry-material association, atmospheric effects, lighting setup, post-processed effects, and sensor effects. In at least one embodiment, a game thread 428 receives a clock control signal from a real-time manager module 418 and synchronizes the execution of game engine operations to ensure system determinism by enforcing a deterministic frame rate for critical image generation features. The real-time manager module 418 fetches a synchronization signal from a video card or external synchronization signal to mark the start of a field. The real-time manager module 418 is responsible for scheduling different functionalities to fit a frame refresh rate such as 60 Hz. Alternatively, an external synchronization generator 430 provides a synchronization signal external to the edge component 400. The external synchronization generator 430 may be configured to synchronize the edge component with an existing system having an existing deterministic frequency.

The graphics processing unit module 416 and external synchronization generator 430 establish a multi-channel synchronized output essential for rendering applications like flight simulators to control the thread that allows determinism of functionalities of the game engine 402 that are being exploited.

Embodiments of the present disclosure enable an integrated solution to build applications such as flight simulators that fulfill requirements of game quality graphics, low latency, frame determinism, sensor channels, and cost effectiveness using cloud-native technologies. The combination of a cloud rendering component and an edge rendering component allow a game engine to produce a whole Earth simulation using proprietary or third-party databases.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method comprising:
   preprocessing one or more legacy data elements with a cloud rendering component into a format interpretable by a game engine;
   transmitting the preprocessed data to an edge rendering component;
   instantiating a game engine with an edge rendering component;
   receiving the preprocessed data from the cloud rendering component by the edge rendering component;

supplying the preprocessed data to the game engine; and
rendering a simulation including the preprocessed data via the game engine.

2. The method of claim 1, wherein:
the preprocessed data include legacy commands; and
further comprising interpreting legacy commands to a format suitable for the game engine via the edge rendering component.

3. The method of claim 1, further comprising:
receiving a synchronization signal; and
establishing a deterministic frame rate based on the synchronization signal to produce a multi-channel synchronized output.

4. The method of claim 3, further comprising:
utilizing the synchronization signal to enforce determinism of functions of the game engine.

5. The method of claim 1, further comprising converting a spherical coordinate system associated with one or more legacy data elements into a local coordinate system specific to the game engine.

6. The method of claim 5, wherein:
the identified one or more legacy data elements comprises at least one of satellite imagery, height maps, or textures; and
further comprising:
correlating identified legacy data elements; and
stitching together the correlated identified legacy data elements into a unified image of the area of interest.

7. A system comprising:
a cloud rendering component comprising:
one or more data storage elements;
a communication element; and
at least one processor in data communication with the one or more data storage elements, the communication element, and a memory storing processor executable code for configuring the at least one processor to:
preprocess one or more legacy data elements into a format interpretable by a game engine; and
transmit the preprocessed data to an edge rendering component; and
an edge rendering component comprising:
a communication element; and
at least one processor in data communication with the one or more data storage elements, the communication element, and a memory storing processor executable code for configuring the at least one processor to:
instantiate a game engine;
receive preprocessed data from the cloud rendering component;
supply the preprocessed data to the game engine; and
render a simulation including the preprocessed data via the game engine.

8. The system of claim 7, wherein the edge rendering component at least one processor is further configured to instantiate one or more processes within the game engine to interpret the preprocessed data.

9. The system of claim 7, wherein the edge rendering component at least one processor is further configured to:
receive a synchronization signal; and
establish a deterministic frame rate based on the synchronization signal to produce a multi-channel synchronized output and enforce determinism of functions of the game engine.

10. The system of claim 9, wherein the synchronization signal comprises a vsync signal from a graphics processing unit.

11. The system of claim 9, wherein the synchronization signal comprises an external synchronization signal.

12. The system of claim 7, wherein:
the cloud rendering at least one processor is further configured to:
identify one or more legacy data elements based on an area of interest;
correlate identified legacy data elements; and
stitch together the correlated identified legacy data elements into a unified image of the area of interest, and
the identified one or more legacy data elements comprises at least one of satellite imagery, height maps, or textures.

13. The system of claim 7, wherein:
the edge rendering component comprises one of a plurality of edge rendering components; and
the cloud rendering component is configured to provide preprocessed legacy data to each of the plurality of edge rendering components.

14. The system of claim 7, wherein the cloud rendering component at least one processor is further configured to:
transfer low resolution collision and geometry information to the edge rendering component.

15. The system of claim 14, wherein the edge rendering component at least one processor is further configured to:
instantiate a mission system component configured to upscale collision data to match upscaling by a graphics processing unit; and
sending upscaled collision results back to the cloud rendering component.

* * * * *